United States Patent [19]

Pierrat

[11] Patent Number: 4,549,450
[45] Date of Patent: Oct. 29, 1985

[54] ORBITAL SPEED REDUCER WITH COMPENSATION COUPLING

[76] Inventor: Michel A. Pierrat, 5405 8th St., Charleston, Mass. 02129

[21] Appl. No.: 352,122

[22] Filed: Feb. 25, 1982

[51] Int. Cl.$^4$ ............................................. F16H 1/28
[52] U.S. Cl. ........................................ 74/805; 74/804
[58] Field of Search .................. 74/804, 805, 409, 440

[56] References Cited

U.S. PATENT DOCUMENTS

| | | | |
|---|---|---|---|
| 1,942,794 | 1/1934 | Benson | 74/805 X |
| 2,250,259 | 7/1941 | Foote | 74/805 X |
| 2,303,365 | 12/1942 | Karlsen | 74/805 X |
| 3,045,503 | 7/1962 | Kiessling | 74/805 X |
| 3,144,791 | 8/1964 | Menge | 74/804 |
| 3,429,393 | 2/1969 | Lorence | 74/805 X |
| 3,783,712 | 1/1974 | Colinet | 74/805 |
| 3,998,112 | 12/1976 | Pierrat | 74/805 |
| 4,227,741 | 10/1980 | Gross et al. | 74/409 X |
| 4,348,918 | 9/1982 | Fukui | 74/805 |
| 4,371,207 | 2/1983 | Wilking et al. | 74/804 X |

FOREIGN PATENT DOCUMENTS 955097 4/1964 United Kingdom ................ 74/804

*Primary Examiner*—Leslie A. Braun
*Assistant Examiner*—Joseph M. Rolnicki
*Attorney, Agent, or Firm*—E. Thorpe Barrett

[57] ABSTRACT

A speed reducer with an orbital rotor, mounted for free rotation on a rotor drive wheel driven along an orbital path, has a perimeter defined by an epitrochoidal curve that simultaneously engages each of a series of rollers arranged in a circle around the rotor.

The rotor drive wheel is driven by a compensation coupler that prevents radial forces of the rotor and the rotor drive wheel. The drive shaft provides only a rotary thrust on the rotor drive wheel and is shielded from reaction movements of the rotor and rotor drive wheel.

The rotor drive wheel is driven by a variable-length crank arm that extends into a radial opening in the rotor drive wheel and makes sliding engagement with opposite faces of the radial opening. The driving surfaces that engage the faces of the radial opening form, in a plane perpendicular to the axis of the drive shaft, arcs of a circle equal in diameter to the width of the radial opening. The crank arm includes an expansion slot that divides it into two fingers that embrace opposite sides of the radial opening. For smaller units, the spring quality of the fingers is relied upon to maintain firm engagement between the fingers and the faces of the slot.

8 Claims, 6 Drawing Figures

ORBITAL SPEED REDUCER WITH COMPENSATION COUPLING

CROSS REFERENCE TO RELATED APPLICATIONS

This application is related to my copending U.S. Patent Application entitled SPEED REDUCER AND METHOD FOR REDUCING BACKLASH, Ser. No. 06/344,886, filed Feb. 1, 1982.

BACKGROUND OF THE INVENTION

1. Field of the Invention

This invention relates to an orbital speed reducer having an improved drive system. More particularly it relates to a drive system for eliminating radial forces on the drive mechanism and thereby increasing the life of the bearing structure and facilitating the repair or interchange of drive motors.

2. Description of the Prior Art

Speed reduction mechanisms making use of epicyclical movements with gear-like rotors having a perimeter defined by an epitrochoid curve have long been known. The magazine Design News in its Aug. 18, 1961 issue describes a single-stage cycloidal cam that forms the basis of a speed reducing mechanism. A similar structure is shown in my U.S. Pat. No. 3,998,112. Corresponding devices were previously known that made use of spur gears. U.S. Pat. No. 2,250,259 to Foote, Jr. describes such a heliocentric unit. Other related mechanisms are described in U.S. Pat. Nos. 3,429,393; 3,144,791; and 3,783,712.

In operation, most of these speed reducing mechanisms generate radial forces on the drive shaft or its bearings that increases wear, requires stronger drive shafts and associated mechanisms, and makes necessary at least two spaced bearing supports for the drive shaft. To eliminate or limit these radial forces, some of the prior art devices are constructed with substantial tolerances beween the cycloidal cam and the associated rollers or, in a gear type unit, between the teeth of the sun and planet gears. Such tolerances inevitably result in backlash that renders the unit unsatisfactory for precision motion control applications.

SUMMARY OF THE INVENTION

The invention is embodied in a speed reducer, suitable for precision motion control applications, of the type described above in which a compensation coupling is interposed between the drive shaft and an orbitally driven rotor. The compensation coupling is arranged to provide rotary motion of a rotor drive element or wheel carried by the rotor while permitting deviation of the rotor from its prescribed orbital path without creating radial forces on the drive shaft.

In the unit described here, an orbitally-driven rotor, mounted for free rotation on a rotor drive element driven in a rotary path by a drive shaft, has a perimeter defined by an epitrochoidal curve that simultaneously engages each of a series of surrounding rollers mounted on a stationary support, the number of lobes on the rotor being equal to one less than the number of surrounding rollers. Rotation of the drive shaft causes the rotor to move orbitally and to rotate with a speed reduction equal to the reciprocal of the number of lobes on the rotor. A similar structure may serve as a second stage with a second orbital rotor driven by the first rotor and moved orbitally by the same eccentric. The second stage provides a further speed reduction to an output drive, provided by a rotatable output disk supporting the rollers in the second stage.

In accordance with the present invention, the rotor drive element is driven in a rotary path by a variable-length crank arm that provides only rotary thrust and does not transmit radial forces to the drive shaft. This compensation coupling may take the form of a driving sleeve keyed or otherwise secured to a drive shaft that extends into and makes a sliding fit within a slot in a circular rotor drive element mounted for free rotation within a rotor that follows an orbital path. The driving sleeve slidably engages two opposing internal faces of the slot in the rotor drive element at points displaced radially outwardly from the axis of the drive shaft. The driving sleeve thus forms a crank mechanism, the slot in the rotor drive element being long enough to permit the desired radial movement of the rotor drive element and rotor assembly. Radial movement generated by the interaction of the rotor and the surrounding rollers and transmitted along a first line parallel with the longitudinal axis of the slot, result only in movement of the rotor drive element along the axis of its slot and have no effect other than a slight change in the effect length of the crank arm. Radial movement forces transmitted along a line perpendicular to the longitudinal axis of the slot, merely aid or oppose the torque of the drive motor and result in nothing more than a slight phase shift. Movement at intermediate angles produce a combination of these two effects. The drive shaft is thus protected from high radial forces irrespective of the direction of the movements that would otherwise give rise to those forces.

The driving surfaces of the sleeve extension at the points of contact with the opposing surfaces of the rotor drive wheel form an arc of a circle so that radial movement perpendicular to the axis of the slot will not cause locking or binding upon slight rotary movement of the rotor drive element caused by these radial movements and so that the driving surfaces will at all times remain in firm engagement with the faces of the slot and not become a source of backlash. A longitudinal slot in the end of the driving sleeve divides it into two fingers, each providing one of the driving surfaces that press against the faces of the slot in the rotor drive element eccentric with a compliant force equal to or greater than the maximum torque to be developed under full load conditions. For larger units, an adjustment screw permits precise adjustment of the distance between the drive surfaces of the fingers.

DESCRIPTION OF THE PREFERRED EMBODIMENT

Figure 1:
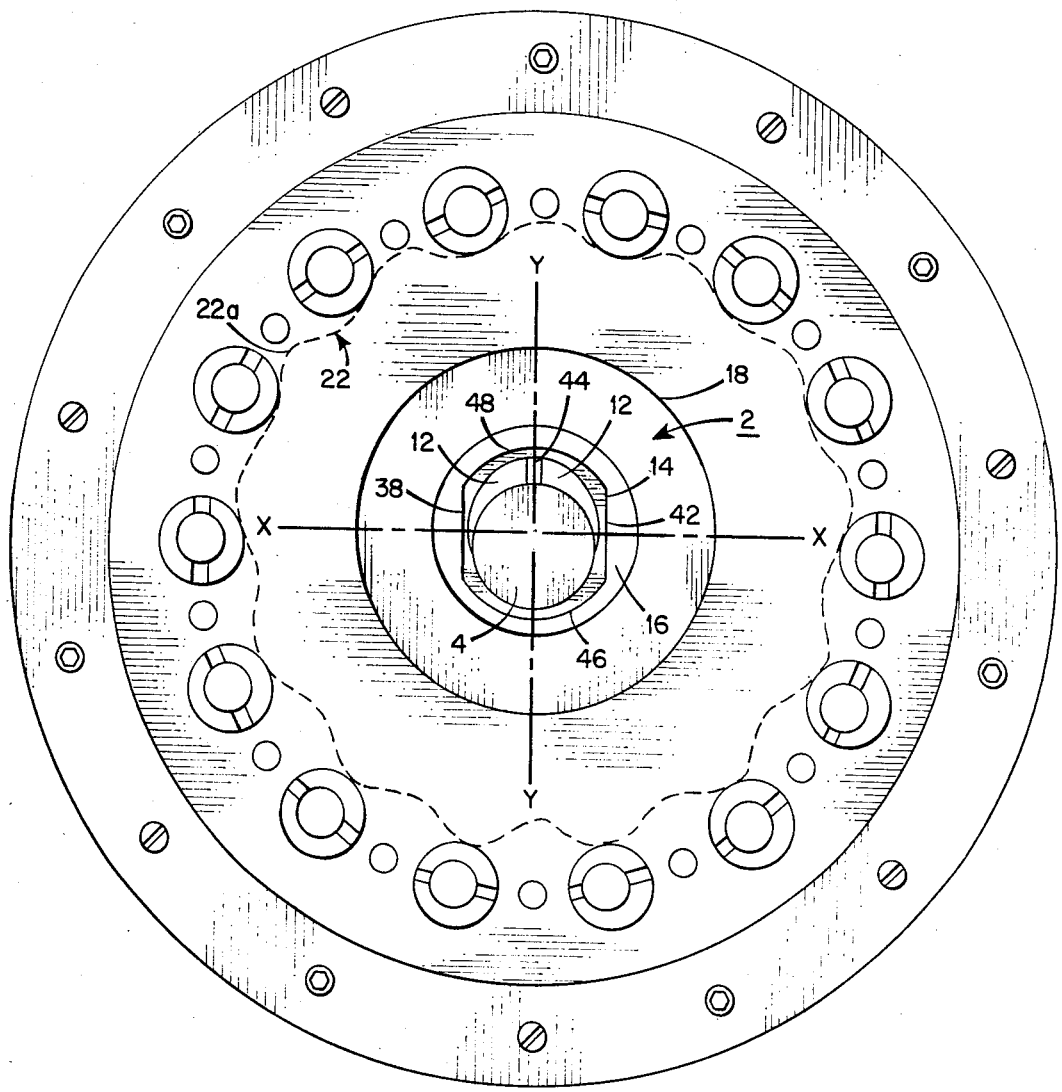
FIG. 1 is a diagrammatic illustration of the output end of a motion control unit embodying the invention to indicate the operation.

As shown in the drawings, a compensation coupling, generally indicated at 2, includes a driving sleeve 3 secured to a drive shaft 4 by a set screw 6 that engages a flat section 8 on the shaft 4. One end portion of the driving sleeve 3 is cut away to form an extension 12 that extends into a slot 14 in a rotor drive element 16 rotatably mounted in an anti-friction bearing 18 that is, in turn, rotatably retained in an opening in an orbital rotor 22.

Fourteen rollers 24, each supported by a shaft 26, are mounted on a supporting disk 28 and arranged equally spaced in a circle to form an operating structure somewhat similar to an internal ring gear. The perimeter of the rotor 22 is formed by a series of thirteen external lobes 22a defined by an epitrochoidal curve and is at all times in engagement with the rollers 24.

When the input shaft 4 is driven, the sleeve extension 12 drives the rotor drive element 16 about a rotary path that is offset from the axis of the shaft 4 causing the rotor 22 to move orbitally, during which movement the outer surface of the rotor remains at all times in contact with each of the rollers 24. This orbital movement of the rotor causes it to revolve about its own axis at a speed equal to one-thirteenth the speed of the shaft 4 and in the opposite direction. The operation of the orbital rotor and associated rollers is fully described in my U.S. Pat. No. 3,998,112 considered in conjunction with my two copending applications referenced above.

Limitations in machining accuracy and the effects of environmental and operational factors, such as temperature changes and stress resulting from applied loads, prevent the construction by usual methods of a precision unit that will not produce radial forces on the driving mechanism. If adequate tolerances are not provided in the dimensions, enormous radial forces can be produced on the driving mechansim. The above copending application entitled SPEED REDUCER AND METHOD FOR REDUCING BACKLASH describes an arrangement in which the rollers engaging the cycloidal rotor are supported by a preloaded structure providing omnidirectional controlled compliance. This preloading in cooperation with the controlled omnidirectional compliance prevents binding of the mechanism while equalizing the load among all of the rollers. Because the forces at the nodes of the lobes can approach infinity, effective load sharing among the rollers is achieved. The support for the rollers must be sufficiently rigid that the roller is not substantially deflected because of the load applied to the unit yet sufficiently compliant to compensate for other factors and prevent backlash. This arrangement permits reversal of the direction of drive without significant backlash, an important advantage in motion control applications. In any event, with or without such compliance in the roller positions, radial movements can be generated that, if not absorbed, would give rise to substantial forces on the drive mechanism. The absorption of these movements by flexible elements such as springs or elastic material such as rubber is likely to give rise to instability or transient oscillations in the motion control system and are therefore to be avoided.

Figure 2:
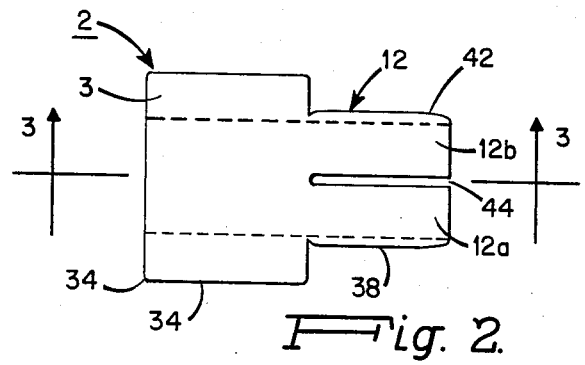
FIG. 2 is a top view of the driving sleeve.
Figure 3:
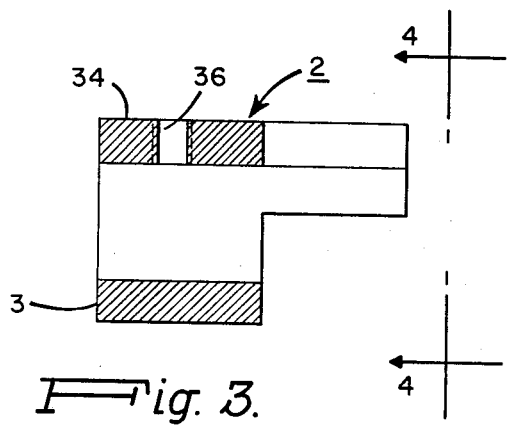
FIG. 3 is a sectional view along line 3—3 of FIG. 2.
Figure 4:
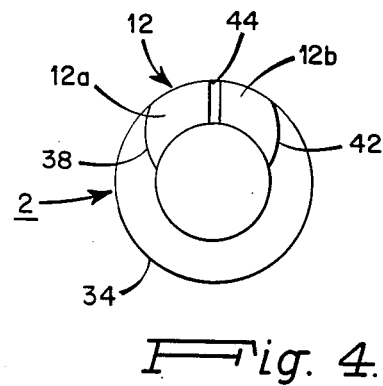
FIG. 4 is an end view along line 4—4 of FIG. 3.

The driving sleeve 3 of the compensation coupling 2 is shown in more detail in FIGS. 2–4. A cylindrical portion 34 of the sleeve 2 has a threaded opening 36 that receives the screw 6. The extension 12, formed integrally with the cyclindrical portion 34, extends approximately one third of the distance around the full circle of the cylindrical portion 34. Two opposed drive surfaces 38 and 42 of the extension 12 form, in the plane perpendicular to the longitudinal axis of the shaft 4, arcs of a circle having a diameter equal to the width of the slot 14 (FIG. 1). When radial movements are generated that cause angular movement of the slot 14 relative to the sleeve extension 12, the arcuate drive surfaces 38 and 42 remain in firm engagement with the adjacent internal faces of the slot. With an arc of greater radius, there would be an increasing likelihood of binding, and with an arc of lesser radius there would be a loss of contact giving rise to backlash or lost motion. In addition, the surfaces 38 and 42 are crowned also along a direction parallel with the longitudinal axis of the sleeve 3 as shown in FIG. 2.

The surfaces 38 and 42 of the driving sleeve 3 engage opposing rectilinear internal faces of the slot 14. To further prevent this coupling from introducing backlash or lost motion into the speed reducer and avoid any possibility of binding, the surfaces 38 and 42 are maintained at all times in close engagement with the internal faces of the slot 14. A spring force is made possible by an expansion slot 44 in the end of the extension 12 that divides the extension into two fingers 12a and 12b. The surfaces 38 and 42 are dimensioned to maintain constant pressure against the internal faces of the slot 14 and the stiffness of the fingers 12a and 12b of the sleeve 3 are such that at full driving torque there is no significant deflection of the fingers 12a and 12b. The ends 46 and 48 (FIG. 1) of the slot 14 are curved and the length of the slot is great enough to allow for the radial movement of the rotor drive wheel.

Figure 6:
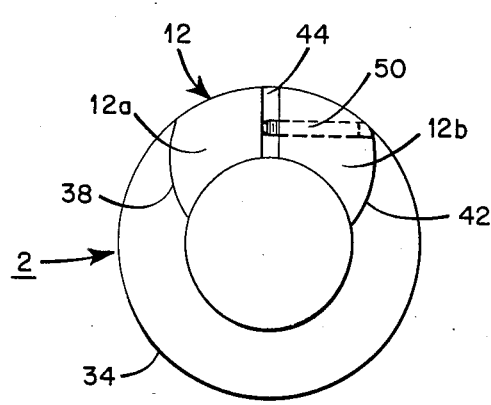
FIG. 6 is a view similar to FIG. 4 showing an adjustment screw for controlling the width of the sleeve extension.

For larger units, the power requirements may not permit use of the simple compliance arrangement just described and a fixed but adjustable width of the sleeve extension is desirable. FIG. 6 shows the same sleeve extension 12 in which an adjustment screw 50 is in threaded engagement with the finger 42 and extends across the slot 44 to abut the adjacent surface of the finger 38.

In operation, a radial movement of rotor 22 and the rotor drive element 16, along a line y—y in FIG. 1, causes the rotor drive element to move parallel with the line y—y relative to the driving sleeve 3 so that no radial force from this source is applied to the drive shaft 4 while the compensation coupling 2 continues to apply rotary force to the rotor drive wheel 16. A radial movement along the line x—x creates a rotary movement against the torque of the motor, shifting the phase of the drive but the only radial force is caused by the driving torque generated by the shaft 4 and is equal to the torque divided by the length of the crank arm.

The shaft 4 is driven, in this example, by a pancake motor 52 (FIG. 5) suitably secured to one end of the speed reducer as by screws 54. In the prior art devices referred to above, the drive shaft is supported by two bearings in the speed reducing unit, but in this example the motor drive shaft is secured to the sleeve 3 which provides the only bearing support for the shaft 4 within the speed reducing unit. This construction is possible because of the limitation of radial forces on the drive shaft 4.

Figure 5:
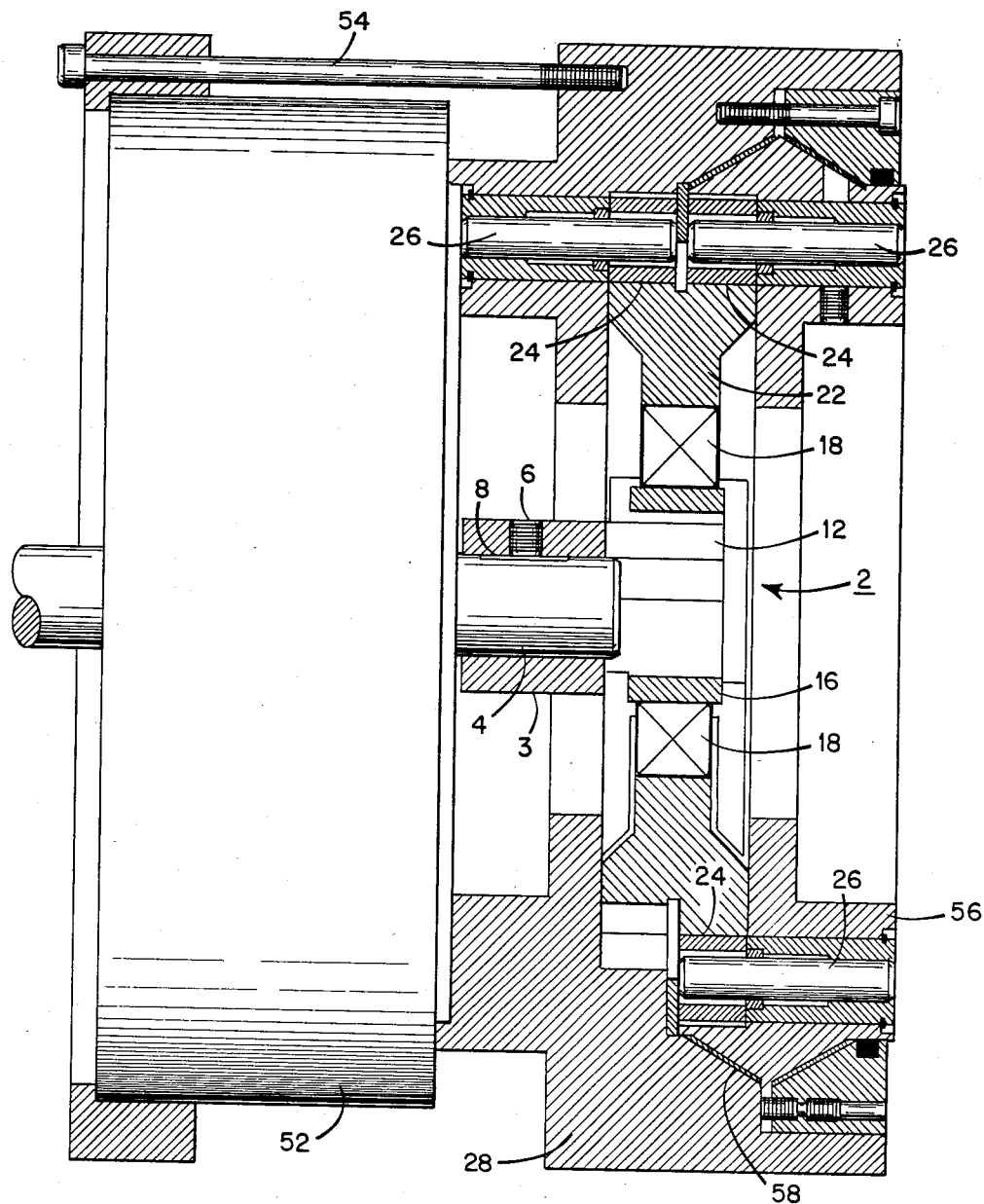
FIG. 5 is a sectional view through a speed reducer embodying the invention.

In the example illustrated in FIG. 5, the disk 28 is integral with the housing of the speed reducer. The rotor 22 is a two-stage rotor, the second stage of which drives an output disk 56. The disk 56 is mounted for rotation relative to the disk 28 by a bearing surface 28. All of the elements of this speed reducer save the compensation coupling are described more fully in my U.S. Pat. No. 3,998,112 and the above-referenced copending applications.

The arrangement shown here facilitates replacement of the motor 52 since access to only one end of the speed reducing mechanism is required. Motor removal is accomplished merely by removing the motor mount screws 54. This method of motor removal is particularly advantageous when the speed reducer is used as a motion control device such as the motive force and positioning device for a robot arm. The robot arm, or some other heavy or complex mechanism, is secured to the end of the speed reducer opposite the motor and would have to be removed to replace or repair the motor in speed reducers of the types heretofore in use.

From the foregoing it will be seen that the speed reducer described herein is suitable for the usual speed change applications, but is also particularly suitable for applications in precision motion control systems where backlash is an overriding consideration. It will be obvious that the particular structure used here to illustrate the invention is subject to many variations, all within the scope of the present invention, by which to best adapt the invention for each particular use.

I claim:

1. A speed reducer comprising
   an orbitally driven rotor having a perimeter defined by a smooth curve forming a plurality of equally-spaced lobes,
   a plurality of spaced rollers arranged on a circle each simultaneously engaging an outer periphery of said rotor, and
   drive means for producing orbital movement of said rotor including
      a drive shaft,
      a rotor drive element rotatably coupled to said rotor arranged to drive said rotor along an orbital path and having a radial opening therein with spaced opposing substantially parallel faces,
      a coupling element arranged to be driven by said drive shaft and having first and second drive surfaces, each of said drive surfaces being crowned in a direction transverse to the longitudinal axis of said drive shaft,
      said first and second drive surfaces being respectively in slidable engagement with said opposing faces of said rotor drive element.

2. A speed reducer as claimed in claim 1 wherein
   said coupling element has first and second fingers and includes
   spring means pressing each of said fingers into engagement with one of said opposing faces.

3. A spaced reducer as claimed in claim 1 wherein
   said coupling element has first and second spaced fingers carrying respectively said first and second drive surfaces and including
   adjustment means arranged to vary the distance between adjacent surfaces of said fingers.

4. A speed reducer as claimed in claim 1 wherein
   each of said drive surfaces is crowned in a direction parallel with the longitudinal axis of said shaft.

5. A speed reducer as claimed in claim 1 wherein each of said drive surfaces forms in a plane transverse to the longitudinal axis of said shaft an arc of a common circle.

6. A speed reducer as claimed in claim 1 wherein
   said coupling element comprises
   a sleeve secured to said drive shaft and having a driving extension extending from one end thereof,
   said extension having a longitudinal slot therein forming first and second drive fingers each providing one of said driving surfaces, and wherein
   the said driving surfaces are dimensioned to maintain constant pressure against the said parallel faces of said rotor drive element.

7. A speed reducer as claimed in claim 6 wherein
   each of said drive surfaces is crowned in a direction parallel with the longitudinal axis of said shaft.

8. A speed reducer as claimed in claim 6 or claim 7 wherein
   each of said drive surfaces forms in a plane transverse to the longitudinal axis of said shaft an arc of a circle having a diameter substantially equal to the distance between said opposing faces of said radial opening.

* * * * *